(12) United States Patent
Meier

(10) Patent No.: US 7,295,494 B2
(45) Date of Patent: Nov. 13, 2007

(54) DIAMAGNETIC CURRENT RESPONSE TRANSDUCER FOR SENSING PRESSURE GRADIENT IN A FLUID MEDIUM

(75) Inventor: Mark A. Meier, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 196 days.

(21) Appl. No.: 11/202,310

(22) Filed: Aug. 11, 2005

(65) Prior Publication Data

US 2006/0092767 A1 May 4, 2006

Related U.S. Application Data

(60) Provisional application No. 60/624,877, filed on Nov. 4, 2004.

(51) Int. Cl.
*G01V 1/18* (2006.01)
(52) U.S. Cl. .................................. 367/178; 181/122
(58) Field of Classification Search ............. 367/141, 367/178, 181; 181/122
See application file for complete search history.

(56) References Cited

U.S. PATENT DOCUMENTS 4,563,894 A * 1/1986 Karrer ...................... 73/24.01
4,648,082 A    3/1987 Savit et al. ................ 367/149
6,832,518 B1 * 12/2004 Berstis ....................... 367/185

FOREIGN PATENT DOCUMENTS

EP     0 669 169     8/1995

OTHER PUBLICATIONS

"Acoustic Particle Velocity Sensors: Design, Performance, and Applications," AIP Conference Proceedings 368, Sep. 1995 (Woodbury, New York: American Institute of Physics, (1996).
Chen, F. F. (1984) "Plasmas as Fluids," *Introduction to Plasma Physics and Controlled Fusion,* New York: Plenum Press, pp. 53-77.
Dawson, J. H, et al. (1992) "On the Possibility of a Steady State Tokamak," *AIP Conference Proceedings,* May 1992, pp. 39-68, XPOO8046642.
Franklin, J. B. and Barry, P. J. (1995) "Acoustic Particle Acceleration Sensors," *AIP Conference Proceedings,* Sep. 1995, pp. 144-165, XPOO8046178.
Labelle, J. and Paschmann, G. (1989) "Motions of the Ring Current Inner Edge Inferred from Plasma Measurements", *Journal of Geophysical Research,* Jan. 1989, pp. 485-491, XPOO8046645.

(Continued)

*Primary Examiner*—Ian J. Lobo

(57) ABSTRACT

A pressure gradient sensor for seismic and other applications utilizing the principle of diamagnetic drift. The sensor comprises at least one transducer, each transducer made of or containing a medium having at least one species of mobile charged particles such as electrons or holes that exhibit diamagnetic drift under a pressure gradient. A magnet and a pair of electrodes are installed in each transducer. Diamagnetic drift current collected by the electrodes can be measured by an ammeter or similar device, and formulas and methods are disclosed to determine the pressure gradient from the measured current.

11 Claims, 2 Drawing Sheets

OTHER PUBLICATIONS

Singh, J. (2003) "Electronic and Optoelectronic Properties of Semiconductor Structures", New York, Cambridge University Press, 440-477.

Steele, M. C. and Vural, B (1969) *Wave Interaction in Solid State Plasmas,* New York, McGraw-Hill, Inc.

*The Electronics Handbook* (1996) Beaverton, Oregon: Technical Press, Inc., p. 124.

*European Standard Search Report* No. RS 112184US, May 13, 2005.

\* cited by examiner

DIAMAGNETIC CURRENT RESPONSE TRANSDUCER FOR SENSING PRESSURE GRADIENT IN A FLUID MEDIUM

This application claims the benefit of U.S. Provisional Patent Application No. 60/624,877 filed on Nov. 4, 2004.

FIELD OF THE INVENTION

This invention relates generally to the field of seismic prospecting in marine settings, and more particularly to receivers for seismic surveys. Specifically, the invention is a transducer for sensing pressure gradient in a fluid medium, and applicability of the invention is not limited to seismic surveying.

BACKGROUND OF THE INVENTION

A vast history exists on the topic of transducers. A brief description follows of existing devices for acquiring pressure gradient and acoustic particle velocity measurements, which may be categorized as follows; i) motion sensors, ii) multiple or arrayed pressure sensors, or iii) a broad category of many approaches including fiber optics, liquid crystals, and others. A more comprehensive discussion of these topics may be found in "Acoustic Particle Velocity Sensors: Design, Performance, and Applications," AIP Conference Proceedings 368, Sep. 1995 (Woodbury, New York: American Institute of Physics, (1996).

i) Motion Sensors: Geophones and accelerometers are very common types of motion sensors that respond directly to the motion of their housing. Provided the housing is rigidly connected to a medium so that the housing moves as the medium moves, the sensor may provide measurement of an acoustic or elastic wave propagating through the medium since such waves cause motion in the medium. For example, a motion sensor attached to the surface of a solid medium or buried in a viscous medium can measure acoustic or elastic waves propagating through those media. Hence, in marine seismic exploration, geophones are placed or buried on the sea bottom. However, the use of motion sensors to measure acoustic particle velocity in a non-viscous fluid medium such as water is problematic. There are two primary reasons for this. First, it is difficult to obtain a rigid connection between the housing of a motion sensor and water, or other nonviscous fluid medium, so that the sensor housing will move as the medium moves. Second, it is often the nature of water and other nonviscous fluid media to host a variety of flows and motions not related to acoustic waves propagating in the media. A motion sensor cannot distinguish motion due to propagating acoustic waves from motion due to incompressible flow or other fluid motions, but will sense all motions. Hence use of a motion sensor to measure acoustic particle velocity becomes difficult.

ii) Pressure Sensors: Hydrophones and other piezoelectric technologies are commonly employed to measure pressure variations in fluid media. Two (or more) pressure sensors placed some distance apart can be used to estimate pressure gradient. Such arrangements of hydrophones are often referred to as "differential", "dipole", or "pressure gradient" hydrophones. The simplest implementation uses the difference in measurements between two closely spaced hydrophones and precise knowledge of their separation. However, such methods are substantially limited in bandwidth and dynamic range compared to the individual hydrophone elements. Low frequencies, such as might be useful in marine seismic exploration, require large separation which has been achieved by towing separate hydrophone streamers at different depths. Under such circumstances, separation and relative orientation of two hydrophones may be variable, imposing an undesirable measurement system dynamic. Additionally, as with all difference measurements, the individual hydrophone and measurement systems must have excellent response uniformity to achieve adequate common mode rejection.

iii) Others: Many other methods have been proposed for pressure gradient and acoustic particle velocity measurements. Each achieves measurement objectives with varying degrees of success. However, it is widely recognized that there are many applications that would benefit from substantial improvements in this technology area.

SUMMARY OF THE INVENTION

In one embodiment, the invention is a sensor for sensing pressure gradient in a fluid volume, comprising at least one transducer, each said transducer comprising a medium containing at least one species of mobile charged particles exhibiting diamagnetic drift under a pressure gradient, a magnetic field source fixedly disposed in or on said medium so as to produce a magnetic flux density in said medium, and two electrodes fixedly disposed in or on said medium and having terminals adapted for connecting by conducting leads to a current measuring device.

In another embodiment, the invention is a method for measuring a pressure gradient in a fluid volume, comprising: (a) selecting a medium containing at least one species of mobile charged particles exhibiting diamagnetic drift under a pressure gradient; (b) placing said medium in contact with said fluid volume such that pressure changes in said fluid volume are transmitted to said medium; (c) applying an external magnetic field to said medium; (d) collecting diamagnetic current with at least two electrodes; (e) measuring said current with a current measuring device; and (f) calculating the pressure gradient in the fluid volume from said measured current.

The step of calculating the pressure gradient in the fluid volume from the measured current i is performed in some embodiments of the invention by (a) calculating a pressure gradient $\nabla p$ in the diamagnetic drift medium from the equation $$i = \frac{\alpha}{B_2} \vec{A} \cdot \vec{B} \times \nabla p$$

where $\vec{B}$ is the applied magnetic field, $\vec{A} = A \vec{\eta}$ where A is the electrode's current collection area with $\vec{\eta}$ a unit vector normal to said electrode surface, $\alpha = \Sigma_s \alpha_s$, where $\alpha_s$ is given by $p_s = \alpha_s p$ where $p_s$ is the partial pressure of mobile charged particle species s and the summation is over all species exhibiting diamagnetic drift; and (b) calculating the pressure gradient in the fluid volume from the pressure gradient in the diamagnetic drift medium using known information on acoustic coupling properties between the fluid volume and the diamagnetic drift medium. In other embodiments of the invention, the diamagnetic drift current from the transducer may be calibrated using known pressure gradients.

BRIEF DESCRIPTION OF THE DRAWINGS

The present invention and its advantages will be better understood by referring to the following detailed description and the attached drawings in which.

Figure 1:
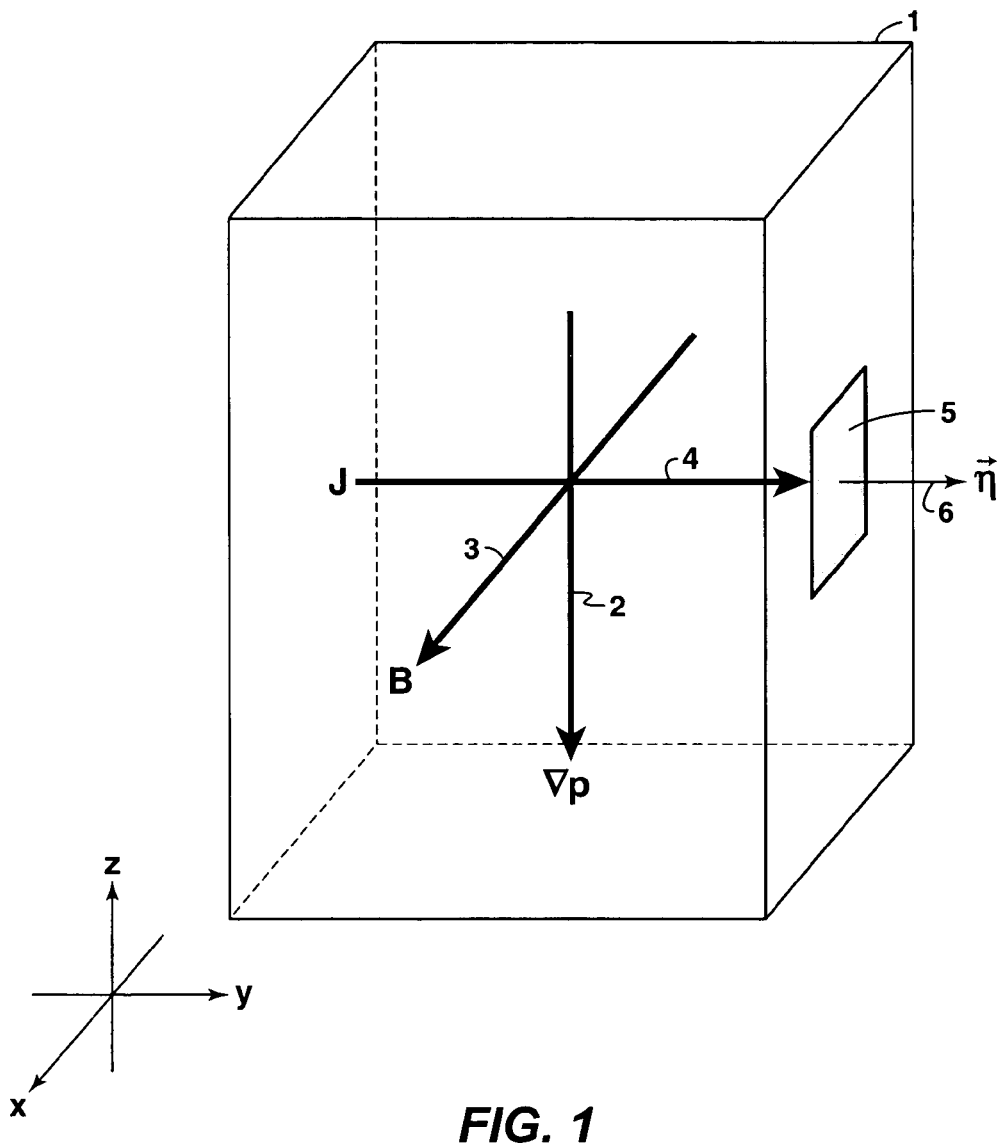
FIG. 1 illustrates the geometric relationship between the pressure gradient to be measured, the applied magnetic field, and the electrode orientation in a one embodiment of the present invention.

The invention will be described in connection with its preferred embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the spirit and scope of the invention, as defined by the appended claims.

DETAILED DESCRIPTION OF THE PREFERRED EMBODIMENTS

The proposed invention is a pressure gradient transducer (and method for using it) that employs the principle of diamagnetic current response of a system of mobile charged particles in a magnetic field to a pressure gradient orthogonal to the field. The invention provides a means to measure pressure gradient and, consequently, acoustic particle velocity of an acoustic wave in a fluid medium. The invention may be used for improved measurements of an acoustic wave near a low impedance boundary, or in combination with pressure measurements to determine acoustic intensity or direction of propagation, or to compensate effects derived from nearby boundary conditions; e.g., ghosting, multiple reflections, or to provide feedback for active acoustic boundary control.

The principle of diamagnetic drift is derived from the fluid description of systems of mobile charged particles. (See Francis F. Chen, *Introduction to Plasma Physics and Controlled Fusion* (New York: Plenum Press, 53-77 (1984).) A system of mobile charged particles may consist of several "species", each consisting of charged particles of a certain nature; e.g., charge number and mass. For example, electrons and protons are two species that constitute a hydrogen plasma. When exposed to a magnetic field, systems of mobile charged particles are known to exhibit several types of behavior. In particular, a pressure gradient in the particle population that is orthogonal to a magnetic field will create a diamagnetic current in the direction mutually orthogonal to both the pressure gradient and the magnetic field. The diamagnetic drift velocity for a population of particles of species "s" is given by the equation $$\vec{u}_s = \frac{-\nabla p_s \times \vec{B}}{q_s n_s B^2},$$

where $\vec{u}_s$ is the diamagnetic drift velocity for species "s", $\nabla p_s$ is the partial pressure gradient for species "s", $\vec{B}$ is the magnetic flux density, $q_s$ is particle electric charge of species "s", and $n_s$ is the charged particle number density of species "s". The current density is the product of the drift velocity, number density, and particle electric charge. The total diamagnetic current density for all species combined is given by $$\vec{J} = \sum_s q_s n_s \vec{u}_s = \sum_s \frac{-\nabla p_s \times \vec{B}}{B^2} = \frac{\vec{B} \times \nabla \sum_s p_s}{B^2},$$

where $p_s$ is the partial pressure for species "s," and the summation is over all such species that exhibit significant diamagnetic drift under the given value of B.

The current to a cross-sectional area, A, with unit normal $\vec{\eta}$, is given by $$i = \vec{J} \cdot \vec{A} = \frac{\vec{A} \cdot \vec{B} \times \nabla \sum_s p_s}{B^2},$$

where $\vec{A} = A\vec{\eta}$. Hence, a transducer principle is defined relating electric current to pressure gradient. In constructing such a transducer, one may control the relative orientation of $\vec{A}$ and $\vec{B}$ so that they are orthogonal to one another. In this case, the current equation may be written $$i = \frac{A\left|\nabla \sum_s p_s\right|}{B} \cos\theta,$$

where $\theta$ is the angle between $\vec{A} \times \vec{B}$ and $\nabla \Sigma_s p_s$. The component of $\nabla \Sigma_s p_s$, that is mutually orthogonal to $\vec{A}$ and $\vec{B}$ contributes to the current. This component may be designated $\nabla_x \Sigma_s p_s$ and described by $$\nabla_x \sum_s p_s = \frac{\vec{A} \times \vec{B}}{AB} \cdot \nabla \sum_s p_s = \left|\nabla \sum_s p_s\right| \cos\theta.$$

Consequently, the current equation may be written $$i = \frac{A \nabla_x \sum_s p_s}{B},$$

where it is understood that pressure gradient refers only to the component of pressure gradient mutually orthogonal to $\vec{A}$ and $\vec{B}$. It may be desirable to package three such transducers together, oriented to measure pressure gradients in each of three mutually orthogonal directions. The vector sum of all three components gives the complete pressure gradient.

The transduction constant describes the relationship between the output of a transducer and the desired property to be measured by the transducer. In this case, the transduction constant is defined by $$k = \frac{i}{\nabla_x p},$$

where $\nabla_x p$ is the total pressure gradient in the direction mutually orthogonal to both $\vec{A}$ and $\vec{B}$. Hence, $i=k\nabla_x p$. With a known transduction constant and a measured transducer current, the desired property of pressure gradient may then be determined by $\nabla_x p = i/k$.

A fully ionized plasma may consist of many different species of mobile charged particles. The total pressure is the sum of partial pressures of all species, $p=\Sigma_s p_s$. Consequently, $\nabla_x p = \nabla_x \Sigma_s p_s$. Assuming all species contribute to the diamagnetic current, the current equation may be written $$i = \frac{A \nabla_x p}{B},$$

and the transduction constant is $k=A/B$. Hence, from the transducer current, one may determine the pressure gradient from the relation $$\nabla_x p = \frac{i}{k} = \frac{iB}{A}.$$

Some systems may be comprised of free moving charged particles that contribute to diamagnetic current and other components that do not contribute to diamagnetic current; e.g., neutral particles. In this case, the total pressure may be considered in terms of the sum of all partial pressures of species that do contribute to diamagnetic current, $p_i = \Sigma_s p_s$, and the sum of all partial pressures that do not contribute to diamagnetic current, $p_n = \Sigma_q p_q$. Then the total pressure in the system is given by $p=p_i+p_n$. A partial pressure may also be written as a fraction of total pressure; $p_s = \alpha_s p$, where $\alpha_s$ may be called the partial pressure proportion for species "s". Furthermore, one may define $\alpha = \Sigma_s \alpha_s$. Then the sum of partial pressures of species that contribute to diamagnetic current is given by $p_i = \Sigma_s p_s = \Sigma_s \alpha_s p = \alpha p$. The current equation may then be written, $$i = \frac{A \nabla_x \sum_s p_s}{B} = \frac{A \nabla_x p_i}{B} = \frac{\alpha A \nabla_x p}{B}.$$

In this case, the transduction constant is given by $k=\alpha A/B$ and the total pressure gradient is obtained from the transducer current by the relation $$\nabla_x p = \frac{i}{k} = \frac{iB}{\alpha A}.$$

In this general form for the current equation, setting $\alpha=1$ yields the previous equation for a medium where all particles that contribute to the total pressure are mobile charged particles.

The transduction constant may be determined by several means, including employing knowledge of partial pressure proportions, $\alpha_s$, for a known material, or by a process of calibration. For the latter, a transducer may be subjected to a known pressure gradient, say $[\nabla_x p]_{control}$, then the output current measured and denoted $i_m$. The transduction constant is then given by $k=i_m/[\nabla_x p]_{control}$.

A medium 1 comprised of a system of one or more species of mobile charged particles with a total pressure gradient 2 and a magnetic field 3 normal to the pressure gradient is illustrated in FIG. 1 as a three dimensional perspective drawing (mobile charged particles not shown). A diamagnetic current density 4 is generated which is orthogonal to both the pressure gradient and the magnetic field. The diamagnetic current to a cross-sectional area 5 whose normal 6 is mutually orthogonal to both the pressure gradient and magnetic field is given by $i=A\nabla p/B$, where the quantities in the equation are defined as stated above. Hence, the pressure gradient may be determined from the measured diamagnetic current by $\nabla p = iB/A$. In a similar manner, it follows that under the same assumptions, the relationship for a medium comprised of a system of one or more species of mobile charged particles and components that do not contribute to diamagnetic current, simplifies to $\nabla p = iB/\alpha A$.

The description above relates diamagnetic current to pressure gradient in a population of mobile charged particles subject to a magnetic field. There are many materials that may host populations of mobile charged particles. These include plasmas, gaseous discharges, gaseous plasmas, solid state plasmas, metals, semimetals, liquid metals, conductive fluids, semiconductors, electrically conducting and superconducting materials. Of particular interest may be solid state plasmas, including systems of mobile charged particles in a semiconductor material (see Martin C. Steele and Bayram Vural, *Wave Interaction in Solid State Plasmas*, New York, McGraw-Hill, Inc. (1969)) and the properties of semiconductors in magnetic fields (see Jasprit Singh, *Electronic and Optoelectronic Properties of Semiconductor Structures*, New York, Cambridge University Press, 440-477 (2003)). Mobile charged particles in many semiconductor materials consist of electrons and "holes". A hole represents an absence of an electron, and is a concept widely recognized in semiconductor work. For the purpose of this document, a hole will be considered a positively charged mobile particle. There are varying degrees of charged particle mobility, and not all materials exhibit the described behavior to a significant degree. It is anticipated the desired behavior may occur when the product of charge particle mobility and magnetic flux density is of the order of, or exceeds, unity; i.e., preferably >0.5, more preferably >1.0. This condition describes the case in which the cyclotron frequency, or the frequency at which the mobile charged particles orbit the magnetic field lines, nearly equals or exceeds the collision frequency, or the frequency which the mobile charged particles collide with obstacles or each other thereby having their paths of travel interrupted. When this condition is met, the charged particles are able to complete cyclotron motions about the magnetic field lines, and a requirement for realizing the diamagnetic current is satisfied.

Figure 2:
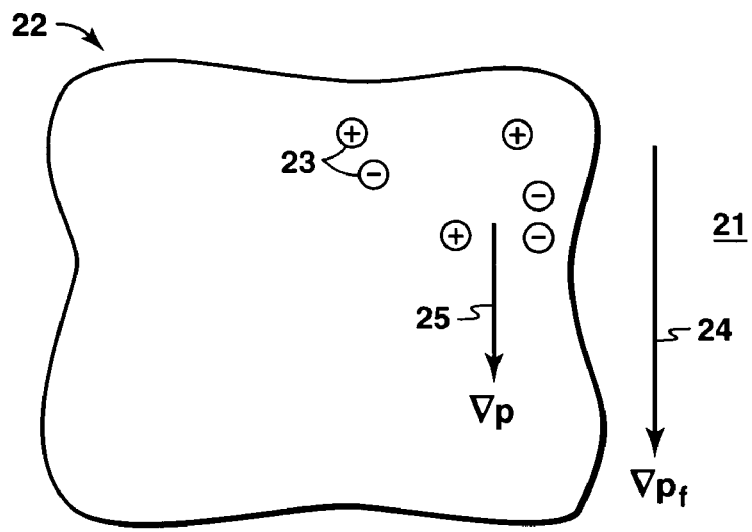
FIG. 2 illustrates acoustic coupling between a fluid medium having a pressure gradient to be measured and a transducer of the present invention.

In some applications, including seismic applications, the fluid medium hosting the propagating acoustic wave and associated pressure gradient will not, itself, possess the properties required to realize a diamagnetic transducer effect. In this case, the medium may be brought into physical contact with a medium hosting mobile charged particles so that the pressure gradient in the fluid medium will cause a pressure gradient in the mobile charged particle population which may then be ascertained from measurement of the diamagnetic current. FIG. 2 illustrates a fluid medium 21 in contact with a second medium 22 hosting a mobile charged particle population 23. A pressure gradient 24 in the first fluid medium, $\nabla p_f$, perhaps caused by a propagating acoustic wave, causes a pressure gradient 25 in the mobile charged particle population. The pressure gradient in the mobile charged particle population may be different in magnitude than the pressure gradient in the fluid medium. The difference may be due, in part, to the partial pressure of the mobile charged particle population and the acoustic coupling properties between the fluid medium and the mobile charged particle population. The acoustic coupling may be optimized by matching the acoustic impedance of the medium hosting the charged particles to the acoustic impedance of the fluid medium. Knowledge of partial pressures and acoustic coupling properties may be used to ascertain the pressure gradient in the fluid medium from the pressure gradient in the mobile charged particle population once the latter has been determined from the measured diamagnetic current. Alternatively, a calibration process may be employed to determine the transduction constant.

Figure 3:
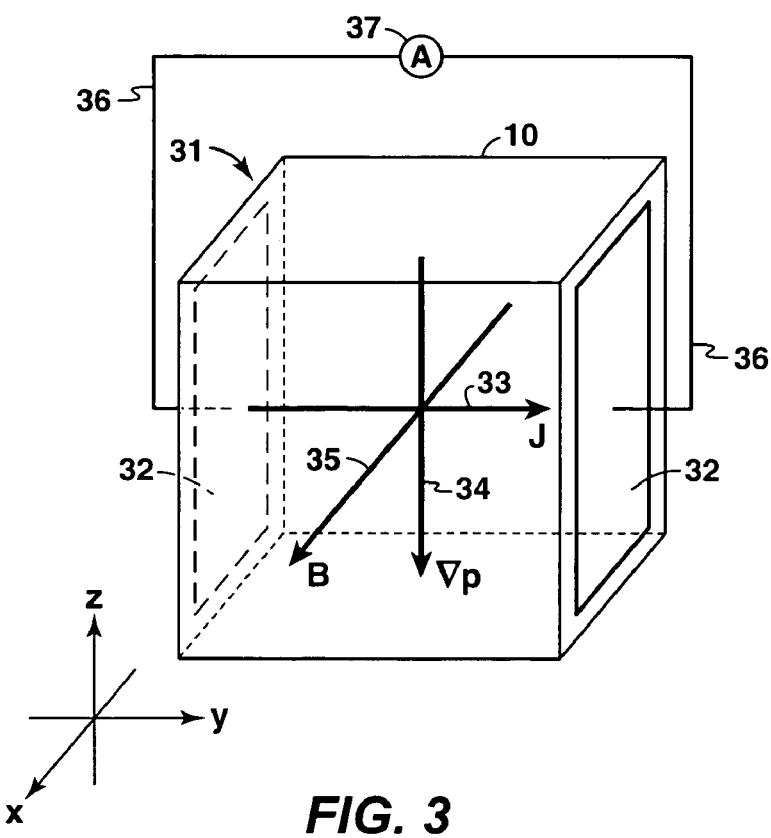
FIG. 3 is a schematic diagram of a sensor of one embodiment of the present invention.

A diamagnetic pressure gradient transducer may be constructed from several different materials. One preferred semiconductor material for this invention is indium antimonide (InSb) because of extremely high mobilities exhibited by its charge carrier population. Electron mobility in InSb at room temperature is estimated at 100,000 cm$^2$/V-sec. (See *The Electronics Handbook* (Beaverton, Oregon: Technical Press, Inc., p. 124 (1996).) Hence, a magnetic flux density of approximately 0.1 Tesla or greater is sufficient for electrons to complete cyclotron motions and provide a diamagnetic current response to a pressure gradient. The invention may be constructed using a volume 31 of InSb sufficiently large compared to the radius of cyclotron motion, as illustrated in three dimensional perspective in FIG. 3 (cyclotron motion not shown). The radius of cyclotron motion for an electron at room temperature in a 0.1 Tesla magnetic field is about 4 microns. Hence, the volume of InSb would preferably exceed 10 microns in dimensions perpendicular to the magnetic field, and may be considerably larger than 10 microns to increase the current collection area and the total current. Plate electrodes 32 are fabricated onto two opposite sides of the volume 31. The electrodes receive the current density 33 generated from a pressure gradient 34 and applied magnetic field 35. Leads 36 connected to the electrodes carry the electric current which is measured by an ammeter or some other current measurement device 37. The invention may be placed in an electrically insulating package so that it may be immersed in a fluid medium such as water, seawater, or other fluid. The measured current provides a measure of the pressure gradient in the fluid medium.

As indicated above, a charge carrier species within a given medium may be mobile, but not have sufficient mobility to exhibit diamagnetic drift to a significant degree. Such is the case for InSb in which the electron mobility is high (100,000 cm$^2$ Volt sec) but the hole mobility is low (1,700 cm$^2$/Volt sec). For such a medium, with B about 0.1 Tesla, the transduction constant depends on the electron partial pressure; that is $\alpha=\alpha_e$, where $\alpha_e$ is the partial pressure proportion for mobile electrons. Pressure gradient must be calculated from the measured current using one of the equations given above in which $\alpha=\alpha_e$. The hole contribution to the measured current will be negligible. If B is increased to about 6 Tesla, the transduction constant depends on both electrons and holes, and pressure gradient is calculated from the measured current using one of the equations given above in which $\alpha=\alpha_e+\alpha_h$, where $\alpha_h$ is the partial pressure proportion for holes. For many materials, charge carrier species and their mobilities are well characterized, or may be determined by established methods. For a chosen B, it is possible to predict which species will contribute significantly to the measured current. The transduction constant depends on the sum of partial pressure proportions of all species that contribute significantly to the measured current; that is $\alpha=\Sigma_s\alpha_s$, where the summation is over all species that contribute to the measured current. The prediction may be further validated by calibration to a known pressure gradient.

A pressure gradient caused by an acoustic wave in a fluid medium is related to the acoustic particle velocity caused by the same wave. The relationship between them is given by $$\rho\frac{\partial \vec{V}}{\partial t}=-\nabla p,$$

where $\rho$ is the mass density of the fluid medium, and $\partial \vec{V}/\partial t$ is the time derivative of the acoustic particle velocity. The acoustic particle velocity may then be obtained from the pressure gradient by $\vec{V}=-\int \nabla p dt/\rho$. Hence, the transducer and method described above is also effective for obtaining acoustic particle velocity in a fluid medium.

The foregoing description is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined by the appended claims.

What is claimed is:

1. A sensor for sensing pressure gradient in a fluid volume, comprising at least one transducer, each said transducer comprising a medium containing at least one species of mobile charged particles exhibiting diamagnetic drift under a pressure gradient, a magnetic field source fixedly disposed in or on said medium so as to produce a magnetic flux density in said medium, and two electrodes fixedly disposed in or on said medium and having terminals adapted for connecting by conducting leads to a current measuring device.

2. The sensor of claim 1, wherein the magnetic field source strength is selected such that the mobility of said charged particles multiplied by the magnetic flux density is approximately 1 or greater.

3. The sensor of claim 1, wherein the electrodes' surfaces are substantially parallel and the normal to said surfaces is substantially perpendicular to the magnetic source's field lines.

4. The sensor of claim 3, having three transducers, oriented in mutually orthogonal directions.

5. The sensor of claim 1, wherein the medium contains a single species of mobile charged particles exhibiting diamagnetic drift, the species being electrons.

6. The sensor of claim 1, wherein the medium contains two species of mobile charged particles exhibiting diamagnetic drift, the species being electrons and holes.

7. The sensor of claim 1, wherein the magnetic field source is a permanent magnet.

8. The sensor of claim 1, further comprising a waterproof, electrically insulating package containing the one or more transducers.

9. The sensor of claim 1, wherein the medium containing at least one species of mobile charged particles exhibiting diamagnetic drift is a semiconductor.

10. The sensor of claim 9, wherein the semiconductor is indium antimonide.

11. The apparatus of claim 1, further comprising a current measuring device connected to the terminals provided for same.

* * * * *

UNITED STATES PATENT AND TRADEMARK OFFICE
CERTIFICATE OF CORRECTION

PATENT NO. : 7,295,494 B2  Page 1 of 1
APPLICATION NO. : 11/202310
DATED : November 13, 2007
INVENTOR(S) : Mark A. Meier It is certified that error appears in the above-identified patent and that said Letters Patent is hereby corrected as shown below:

The formula in column 2, line 50, the denominator should read:

$$i = \frac{\alpha}{B^2} \vec{A} \bullet \vec{B} \times \nabla p$$

Signed and Sealed this

Fifteenth Day of April, 2008

JON W. DUDAS
*Director of the United States Patent and Trademark Office*